Oct. 4, 1949.  A. E. HARKER  2,483,412
CONTAINER
Filed Dec. 22, 1944
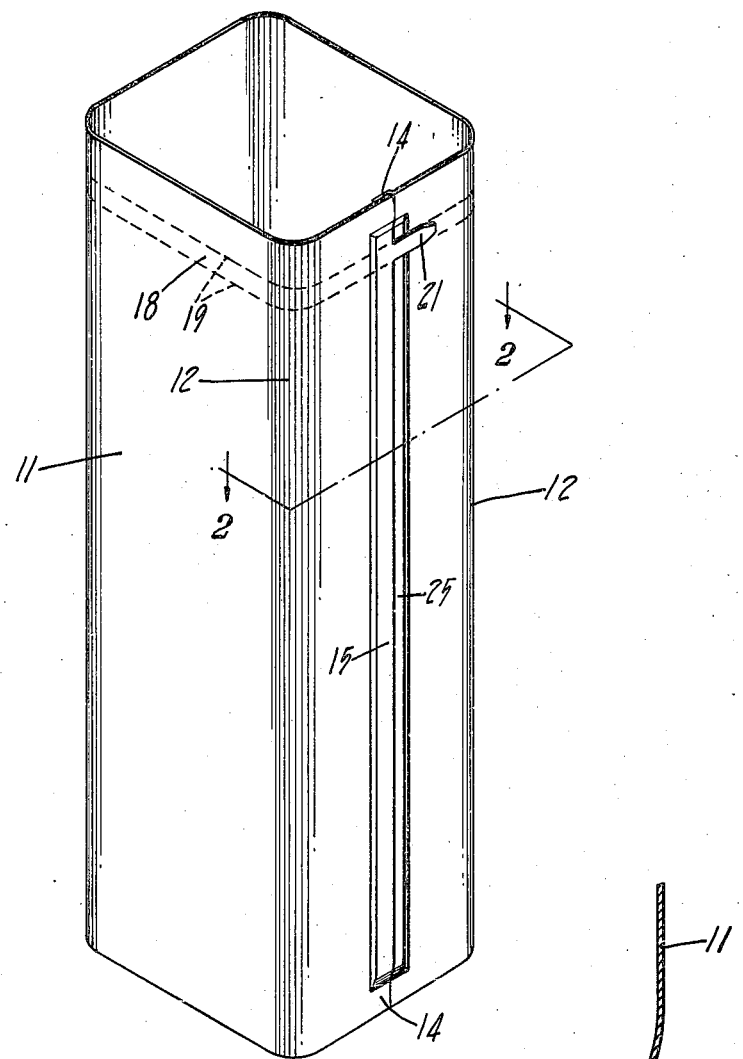
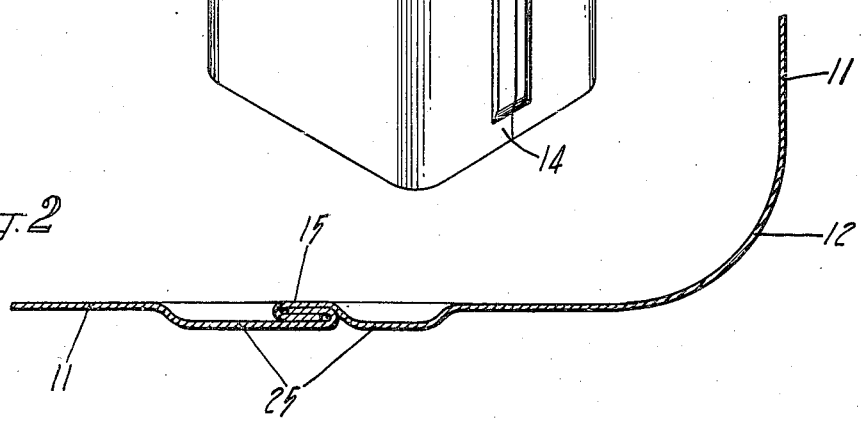
INVENTOR.
Arthur E. Harker
BY Ivan D. Thornburgh
Charles H. Erne
ATTORNEYS Patented Oct. 4, 1949

2,483,412

UNITED STATES PATENT OFFICE

2,483,412
CONTAINER

Arthur E. Harker, Chicago, Ill., assignor to American Can Company, New York, N. Y., a corporation of New Jersey Application December 22, 1944, Serial No. 569,398

1 Claim. (Cl. 138—74)

The present invention relates to containers or cans having tubular bodies formed with a side seam and has particular reference to reenforcing the side seam to keep it straight.

In the manufacture of sheet metal containers or cans, the can body is usually made from a flat blank which is bent into a tubular shape and its terminal edges interfolded and soldered to produce a side seam which holds the body together. Soldering of the side seam usually is performed by passing the can body endwise along the length of a rotating solder roll which wipes hot molten solder into the seam. This operation is followed by a wiping operation effected by a rotating cloth wheel which removes excess solder from the seam.

When can bodies to be soldered are exceedingly long, as for example approximately ten inches or more, the heat from the solder bath in which the roll rotates and along which the body travels, sometimes warps or otherwise distorts the side wall of the body to such an extent that its side seam becomes undulated or bowed away from the plane of the side wall so that portions of the seam engage the roll improperly or do not engage it at all. This leaves portions of the seam improperly soldered or not soldered at all. This uneven condition of the seam also affects the wiping action so that improper wiping of the seam results. In cans having a rectangular cross-section this condition is greatly increased because of the flat relatively flexible sides of the can. To partly counteract this warping of the seam excessive pressure between the body and the solder roll has been resorted to but even this does not overcome the difficulty when the body is extra long.

The instant invention contemplates overcoming this difficulty by reenforcing the can body adjacent the side seam with a longitudinal panel section which will resist distortion.

An object of the invention is the provision of a can body having a side seam wherein the body wall adjacent the seam is formed in a manner which reenforces the seam so that distortion of the seam will be prevented.

Another object is the provision of such a container wherein the body wall is formed with a longitudinal panel section extending parallel with the side seam and in which the seam is located so that it will be reenforced against warping or other distortion.

Another object is the provision of a container of this character wherein the reenforcing panel section is formed to avoid draining of the solder away from the side seam during the soldering operation while also providing a restricted area adjacent the seam to control the width of the solder band applied to the body.

Numerous other objects and advantages of the invention will be apparent as it is better understood from the following description, which, taken in connection with the accompanying drawings, discloses a preferred embodiment thereof.

Referring to the drawings:

Figure 1 is a perspective view of a can body embodying the instant invention; and Fig. 2 is an enlarged fragmentary transverse section taken substantially along a plane indicated by the lines 2—2 in Fig. 1.

As a preferred embodiment of the instant invention the drawings illustrate an elongated sheet metal can body for a container adapted to hold spiced luncheon meat, such as ham or the like. The body illustrated is rectangular in cross-section and is formed with flat, straight side walls 11 which merge into rounded corner sections or portions 12. The ends of the body are adapted to be flanged in the usual manner for the attachment thereto of end members to complete the can.

In one side of the can body, the terminal edges of the blank from which the body was made, is interfolded to form a lock and lap side seam which extends longitudinally of the body for its full length. This seam has lap sections 14 disposed at the ends of the body and a lock section 15 intermediate the ends. The lock section of the seam extends the greater part of the length of the body, the lap sections being formed near the ends only to avoid extra thickness of metal in the end flanges. The entire seam is soldered from the outside of the body by application thereto of hot molten solder.

The body, adjacent one end preferably is formed with a tearing strip 18 which is defined by a pair of spaced and parallel score lines 19. These score lines extend entirely around the body in the usual manner. Adjacent one end of the tearing strip a tongue 21 is provided for removing the strip. This tongue extends beyond the seam and lies flat against the body.

In order to reenforce the side seam against distortion out of its longitudinal plane during the soldering operation, that area of the body side wall 11 which includes the seam is formed with an embossed panel wall section or portion 25 which projects outwardly beyond the plane of the body side wall and is formed integrally with the metal sheet of which the body is composed. This panel wall section extends longitudinally of the body for substantially the full length of the seam and is parallel with the seam. The seam is located substantially in the middle of this panel wall section. In the drawing the seam is shown on the inside of the panel wall section, although this is merely one embodiment as the invention is equally well adapted to an outside seam formed on the outside of the panel. When the seam is on the inside of the body, the panel wall section forms a recess for the seam so that the inner surface of the seam is substantially flush with the inner surface of the body wall.

Thus the panel wall section 25, extending laterally on each side of the side seam, reenforces or stiffens the side seam and the adjacent body wall and thus holds the side seam straight against warping, bowing or other distortion during and due to the heat incident to the soldering operation. Hence the solder will be applied uniformly along the seam for its full length when the body is passed over the solder roll in the soldering operation.

The panel wall section 25 being relatively narrow as compared with the width of the body side wall and being raised outwardly beyond the wall, restricts the area to which the solder is applied during the soldering operation and thus controls the quantity of solder applied to each body. The panel wall section, extending for a short distance on each side of the seam also tends to keep the solder in place at the seam while the solder is molten and thus prevents draining of the solder away from the seam.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In an elongated rectangular container body having substantially flat sheet metal side walls, one of said walls including the opposed longitudinal edges of the body secured together in a soldered side seam; means for reenforcing the side seam area of said body wall to prevent the seam from flexing out of the plane of the wall due to the heat of the soldering operation, comprising a rigid elongated embossed panel formed integrally in the opposed edges of said body and extending on opposite sides of said side seam.

ARTHUR E. HARKER.

REFERENCES CITED

The following references are of record in the file of this patent:

UNITED STATES PATENTS

| Number | Name | Date |
|---|---|---|
| 6,834 | Rohrman | Jan. 4, 1876 |
| 583,379 | James | May 25, 1897 |
| 841,736 | Stuber | Jan. 22, 1907 |
| 1,899,755 | Grigis | Feb. 28, 1933 |
| 1,935,848 | Kielberg | Nov. 21, 1933 |
| 2,171,714 | Schrader | Sept. 5, 1939 |
| 2,342,109 | Atkinson | Feb. 22, 1944 |